(12) United States Patent
Fei

(10) Patent No.: US 10,311,322 B2
(45) Date of Patent: Jun. 4, 2019

(54) CHARACTER INFORMATION RECOGNITION METHOD BASED ON IMAGE PROCESSING

(71) Applicant: SUNTRONT TECH CO., LTD, Henan (CN)

(72) Inventor: Jiheng Fei, Henan (CN)

(73) Assignee: SUNTRONT TECH CO., LTD, Henan (CN)

( * ) Notice: Subject to any disclaimer, the term of this patent is extended or adjusted under 35 U.S.C. 154(b) by 17 days.

(21) Appl. No.: 15/649,654

(22) Filed: Jul. 14, 2017

(65) Prior Publication Data

US 2017/0308768 A1 Oct. 26, 2017

Related U.S. Application Data

(63) Continuation of application No. PCT/CN2015/084196, filed on Jul. 16, 2015.

(30) Foreign Application Priority Data

Jan. 15, 2015 (CN) .......................... 2015 1 0020184

(51) Int. Cl.
*G06K 9/00* (2006.01)
*G06K 9/34* (2006.01)
(Continued)

(52) U.S. Cl.
CPC ........... *G06K 9/344* (2013.01); *G06K 9/6202* (2013.01); *G06K 9/6215* (2013.01); *G06K 9/68* (2013.01);
(Continued)

(58) Field of Classification Search
CPC .... G06K 9/344; G06K 9/6202; G06K 9/6215; G06K 9/68; G06K 9/78; G06K 2209/01; G06T 11/60
See application file for complete search history.

(56) References Cited

U.S. PATENT DOCUMENTS

2010/0329555 A1 12/2010 Chapman et al.
2011/0280451 A1* 11/2011 Sarkar ................ G06K 9/00483
382/112

(Continued)

FOREIGN PATENT DOCUMENTS

CN 101706873 5/2010
CN 1017066873 * 5/2010
(Continued)

*Primary Examiner* — Ping Y Hsieh
(74) *Attorney, Agent, or Firm* — JCIPRNET

(57) ABSTRACT

The present invention relates to a character information recognition method based on image processing. The method comprises: collecting images to obtain a target character image; then sequentially comparing the target character image with character template images in a character template library to find a maximum of a coincidence area of the character in the target character image with the character templates in the character template images; and when the coincidence area meets a preset condition, determining the target character to be recognized as the character in the corresponding character template image. The character templates are designed to include not only a coincidence-permitted region but also a coincidence-restricted region. The coincidence-restricted region is set, so that the direct comparing and matching of the character templates can be more accurately carried out, thereby improving the recognition speed.

19 Claims, 15 Drawing Sheets
(10 of 15 Drawing Sheet(s) Filed in Color)

(51) Int. Cl.
　　　*G06K 9/62*　　　(2006.01)
　　　*G06K 9/78*　　　(2006.01)
　　　*G06T 11/60*　　(2006.01)
　　　*G06K 9/68*　　　(2006.01)

(52) U.S. Cl.
　　　CPC ................ *G06K 9/78* (2013.01); *G06T 11/60* (2013.01); *G06K 2209/01* (2013.01)

(56) References Cited

U.S. PATENT DOCUMENTS

| | | | | |
|---|---|---|---|---|
| 2011/0280490 | A1* | 11/2011 | Sarkar | G06K 9/00442 382/209 |
| 2012/0051649 | A1* | 3/2012 | Saund | G06K 9/2054 382/195 |

FOREIGN PATENT DOCUMENTS

| | | | |
|---|---|---|---|
| CN | 103116753 | | 5/2013 |
| CN | 103226706 | * | 7/2013 |

* cited by examiner

CHARACTER INFORMATION RECOGNITION METHOD BASED ON IMAGE PROCESSING

CROSS-REFERENCE TO RELATED APPLICATION

This is a continuation of International Application No. PCT/CN2015/084196, filed on Jul. 16, 2015, which claims the priority benefits of China Application No. 201510020184.2, filed on Jan. 15, 2015. The entirety of each of the above-mentioned patent applications is hereby incorporated by reference herein and made a part of this specification.

BACKGROUND OF THE INVENTION

1. Field of the Invention

The present invention belongs to the field of image recognition, and in particular to a character information recognition method based on image processing, i.e. recognizing character information in a header, and characters specified herein include character types, such as numbers, letters, symbols, etc.

2. Description of Related Art

With the popularization of camera devices, the application fields of image recognition technologies are also being broadened constantly.

For example, the remote automatic meter reading technology by acquiring an image of a dial through a camera device, and recognizing information on the dial through image processing. Meters can be character wheel type water meters and electricity meters or can be pointer type pressure meters, etc.

For another example, the license plate recognition technology by recognizing license plate information through processing a monitoring image.

The general steps of image recognition include gray processing, binarization processing, selection of recognition region, segmentation of characters and recognition of each character, and further include second-time judgment on easy-to-be-confused characters.

The key is recognition of characters, and character recognition generally includes two methods:

1. Neural network algorithm. By choosing a large number of sample characters, the samples are trained to obtain network weight coefficients.

2. Character template setting. A character template is a standard image which is compared with a target image when the binarized image is recognized. A character template image is compared with a target image, the degree of similarity between the target image and the character template image is determined, and thereby the recognition of the target image is fulfilled.

In order to achieve a high character recognition rate, the neural network algorithm needs to evaluate the number and quality of all character samples and, by constantly collecting sample data recognized wrong, retrain the samples to constantly increase the character recognition rate.

The method of character template setting is relatively simple, and does not need a complex algorithm, but the recognition effect is relatively poor.

SUMMARY OF THE INVENTION

The objective of the present invention is to provide a character information recognition method based on image processing, which is used for solving the problem that the effect is poor when character template recognition is adopted.

In order to achieve the above-mentioned purpose, the solution of the present invention includes:

a character information recognition method based on image processing, and the steps are as follows:

step (a), collecting images, and obtaining target character images by image preprocessing, wherein each of the target character images is formed by a background and a target character to be recognized on the background;

step (b), for one target character image, sequentially comparing the target character image with character template images in a character template library to find out a maximum of a coincidence area between the target character in the target character image and a character template in one character template image, and determining the target character to be recognized as a character in a corresponding character template image when the coincidence area meets a preset condition.

A plurality of character template images within a specified range compose a character template library. Each character template image formed by a background and a character template at a set position on the background is a standard binarized character image. The character template of each of the character template images comprises a coincidence-permitted region, and the character template of at least one of the character template images comprises a coincidence-restricted region. The coincidence-permitted region is a set standard character, and the coincidence-restricted region is a key region block which is outside of the coincidence-permitted region for differentiating from the other character templates.

In step (b): For one target character image, while the target character image is sequentially compared with the character template images in the character template library, the coincidence rate between the target character image and each character template image participating in comparison is synchronously calculated. The magnitude of the coincidence rate is determined. When the magnitude of the coincidence rate reaches a default condition, the target character to be recognized is recognized as the character of the corresponding character template image.

In step (b): One target character image is respectively compared with all the character template images in the character template library. The target character image is directly superposed on one character template image when the target character image is compared with one character template image, and the coincidence rate between the target character image and the character template image is synchronously calculated. Corresponding coincidence rates between the target character image and all the character template images are sequentially obtained, and it is determined that the target character to be recognized is the character of the corresponding character template image when finding a maximum coincidence rate.

In step (b): One target character image is respectively compared with part of character template images in the character template library. When the target character image is compared with one character template image, the target character image is directly superposed on the one character template image, the coincidence rate between the target character image and the character template image is synchronously calculated, and the coincidence rate is compared with a set value. If the coincidence rate between the target character image and one character template image exceeds the set value, then comparison is stopped, and it is determined that the target character to be recognized is the character of the corresponding character template image.

In step (b): One target character image is respectively compared with all the character template images in the character template library. When the target character image is compared with one of the character template images, the character template image is placed in a region, and the coverage of the region is larger than the size of the character template image. The target character image is used for scanning in the region, and the coverage of scanning ensures that the target character image covers a part region of the region where the character template image is located. The coincidence rate is synchronously calculated each scan, and the maximum value among the coincidence rates calculated each time is then adopted as the coincidence rate between the target character and the character template image. Corresponding coincidence rates between the target character image and all the character template images are sequentially obtained, and it is determined that the target character to be recognized is the character of the corresponding character template image when a maximum coincidence rate among the corresponding coincidence rates between the target character image and all the character template images is found.

In step (b): One target character image is respectively compared with all the character template images in the character template library. When the target character image is compared with one of the character template images, the target character image is placed in a region, and the coverage of the region is larger than the size of the target character image. The character template image is used for scanning in the region, and the coverage of scanning ensures that the character template image covers a part region of the region where the target character image is located. The coincidence rate is synchronously calculated while each scan, and the maximum value among the coincidence rates calculated each time is then adopted as the coincidence rate between the target character and the character template image. Corresponding coincidence rates between the target character image and all the character template images are sequentially obtained, and it is determined that the target character to be recognized is the character of the corresponding character template image when a maximum coincidence rate among the corresponding coincidence rates between the target character image and all the character template images is found.

In step (b): One target character image is respectively compared with part of character template images in the character template library. When the target character image is compared with one of the character template images, the character template image is placed in a region, and the coverage of the region is larger than the size of the character template image. The target character image is used for scanning in the region, and the coverage of scanning ensures that the target character image covers a part region of the region where the character template image is located. The coincidence rate between the target character image and the character template image is synchronously calculated, and the coincidence rate is compared with a set value. If the coincidence rate between the target character image and one character template image exceeds the set value, then comparison is stopped, and it is determined that the target character to be recognized is the character of the corresponding character template image.

In step (b): One target character image is respectively compared with part of character template images in the character template library. When the target character image is compared with one of the character template images, the target character image is placed in a region, and the coverage of the region is larger than the size of the target character image. The character template image is used for scanning in the region, the coverage of scanning ensures that the character template image covers a part region of the region where the target character image is located, the coincidence rate between the target character image and the character template image is synchronously calculated, and the coincidence rate is compared with a set value. If the coincidence rate between the target character image and one character template image exceeds the set value, then comparison is stopped, and it is determined that the target character to be recognized is the character of the corresponding character template image.

A coincidence rate calculation formula is: $k(a'+b')/(a+b)$. The number of pixels of the coincidence-permitted region in the character template image is a, and the number of pixels of the coincidence-restricted region is b. In the process of comparison, the number of the pixels of the target character image coinciding with the coincidence-permitted region is a', the number of the pixels of the target character image not coinciding with the coincidence-restricted region is b', and k is a coefficient.

Image preprocessing includes image segmentation, binarization processing, mean filtering, morphological filtering and edge cutting.

A method for generating one of the character template images for one character includes: first shooting an image of the character, and performing an image processing, so that a binarized image of the character is obtained; then hollowing the binarized image to generate a boundary, drawing a line with a set width in the central portion within the boundary to form a coincidence-permitted region; then adding a coincidence-restricted region outside the boundary; and finally, removing the boundary, so that the character template image is obtained.

The coincidence rate is equal to the sum of the weights of all coinciding points divided by the sum of the weights of all points in one character template. All the coinciding points include coinciding points of the coincidence-permitted region and coinciding points of the coincidence-restricted region. With regard to one point in the character template, the weight of the point in the character template is determined according to whether points which are at the same position as the point are located in the same region in other character templates. The more character templates in which the points at the same position are located in the same region there are, the lower the weight of the point is, otherwise, the less character templates in which the points at the same position are located in the same region there are, the higher the weight of the point is. The same region represents that the points in the other character templates and the point in the character template are located in the coincidence-permitted region at the same time or are located in the coincidence-restricted region at the same time.

The weight is formed by a cardinal number and an increment, the cardinal number is a fixed value, and the increment is a variable value.

The character templates are designed to include not only a coincidence-permitted region but also a coincidence-restricted region. Since the coincidence-restricted regions are set, the character templates can be better differentiated, the direct matching and comparison of the character templates can be more accurately carried out, and moreover, the speed of recognition is high as well.

While a coincidence rate calculation rule is defined, it is taken into consideration that the more the number of the pixels coinciding with the coincidence-permitted region is, the higher the coincidence rate is, and that the more the number of the pixels not coinciding with the coincidence-restricted region is, the higher the coincidence rate is. By a corresponding calculation formula, matching operation for character template comparison can be directly and rapidly carried out.

A character which corresponds to a character template image in which the magnitude of the coincidence rate reaches the preset condition is a target character to be recognized; and a specific method related thereto includes: directly superposing a target character image on a character template image, finding out a maximum coincidence rate, or judging whether the coincidence rate is greater than a set value; or carrying out comparison by scanning to find out a maximum coincidence rate, or judging whether the coincidence rate is greater than the set value. By adopting the scanning method, errors which are caused when the target character is not at the center can be reduced, guaranteeing the accuracy of a result.

While the character templates are generated, "refining" processing can be carried out according to real images, so that recognition can be more accurate and reliable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 is a schematic diagram of the weight of the character template "2".

FIG. 9 is a schematic diagram illustrating an original character template of "2".

Figure 11:
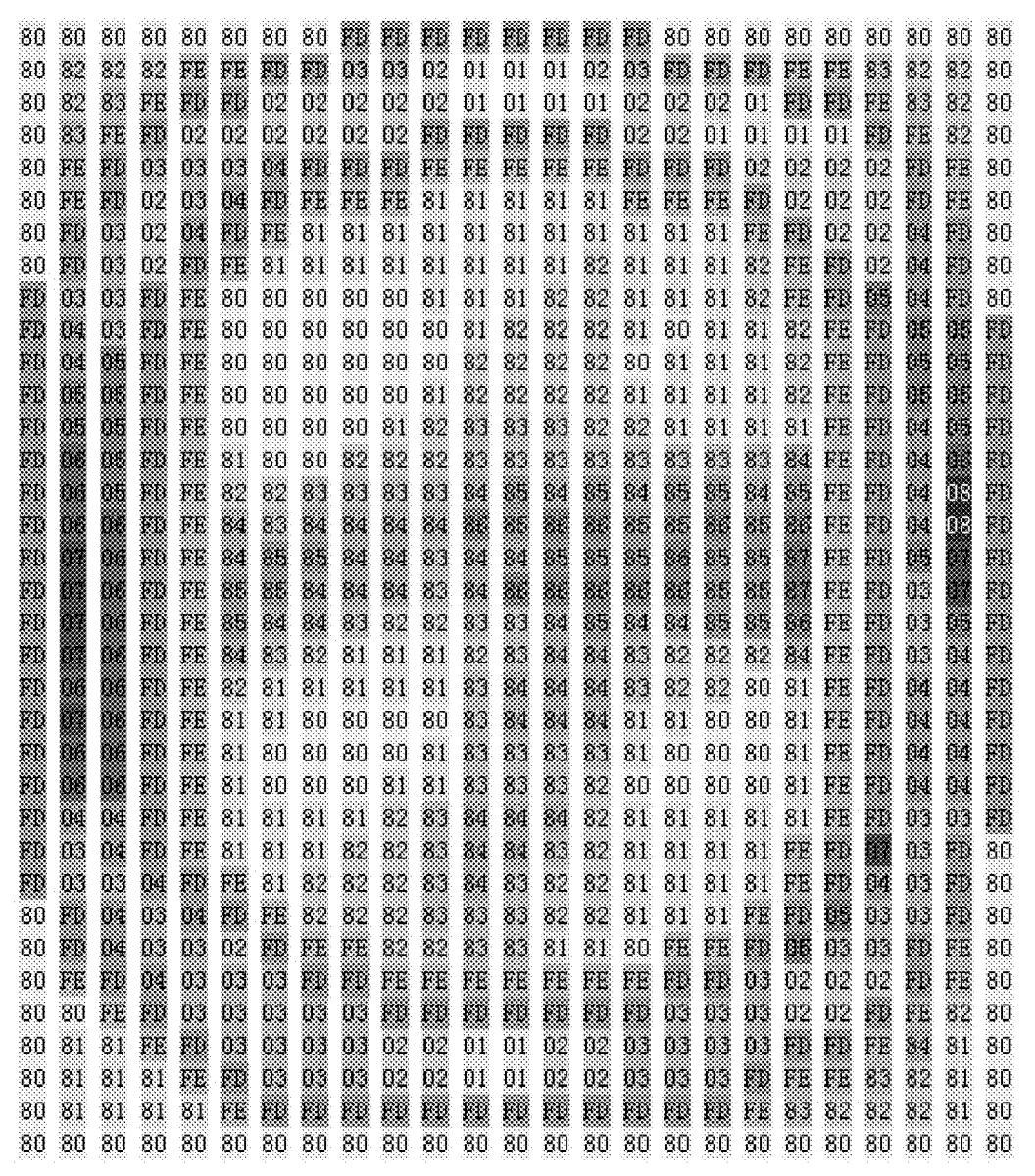

FIG. 11 is a schematic diagram of the weight of the character template "0".

Figure 12:
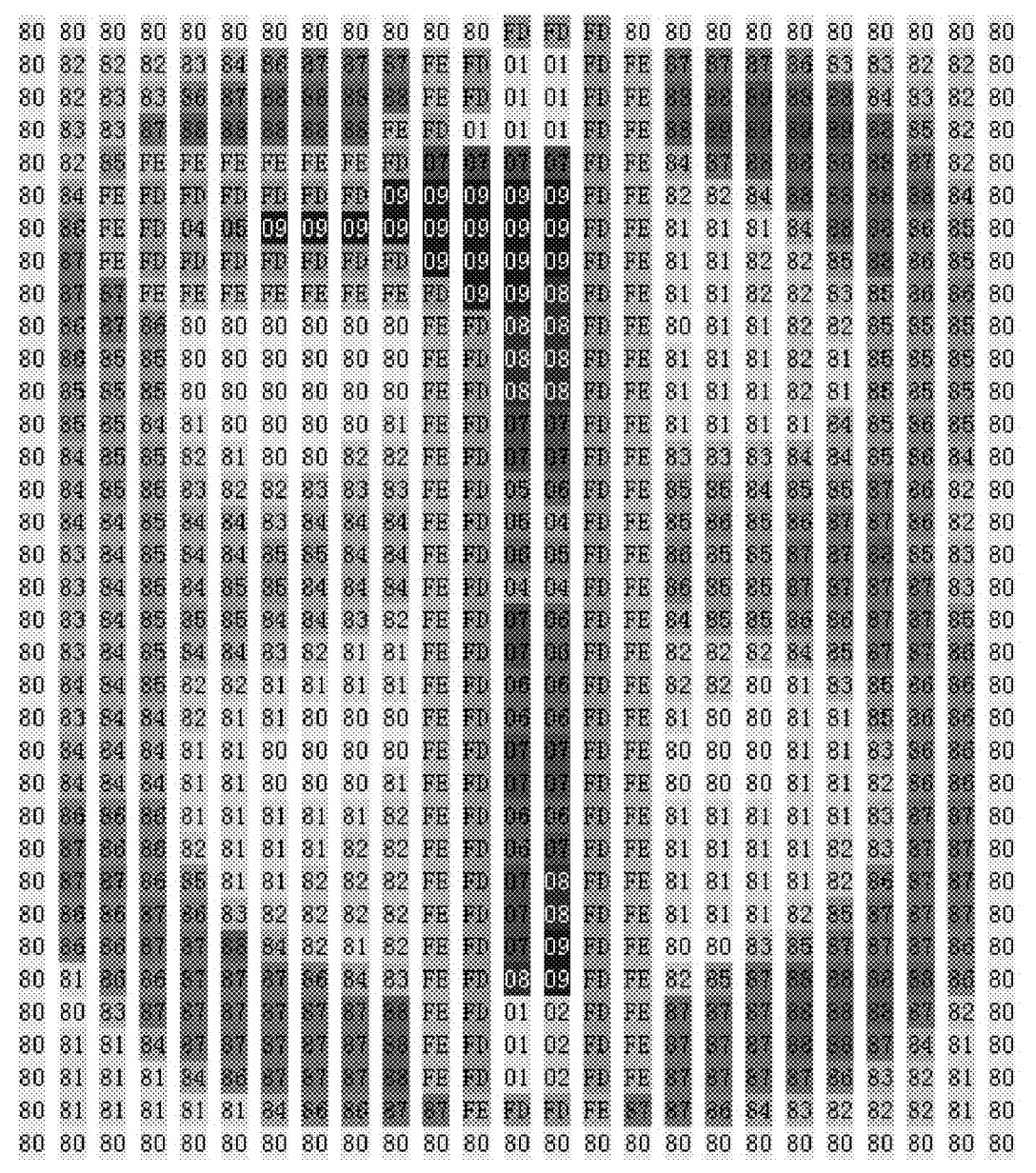

FIG. 12 is a schematic diagram of the weight of the character template "1".

Figure 13:
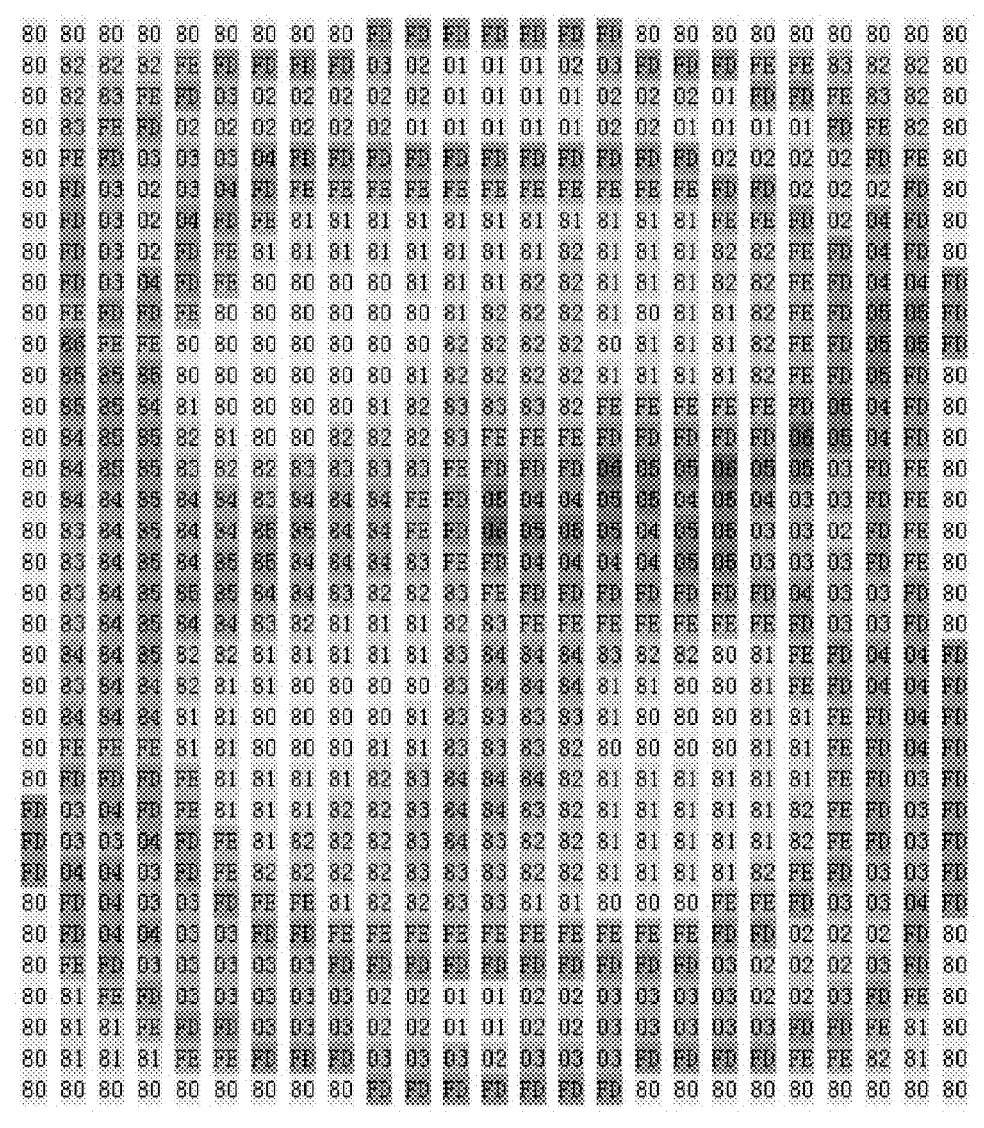
Figure 14:
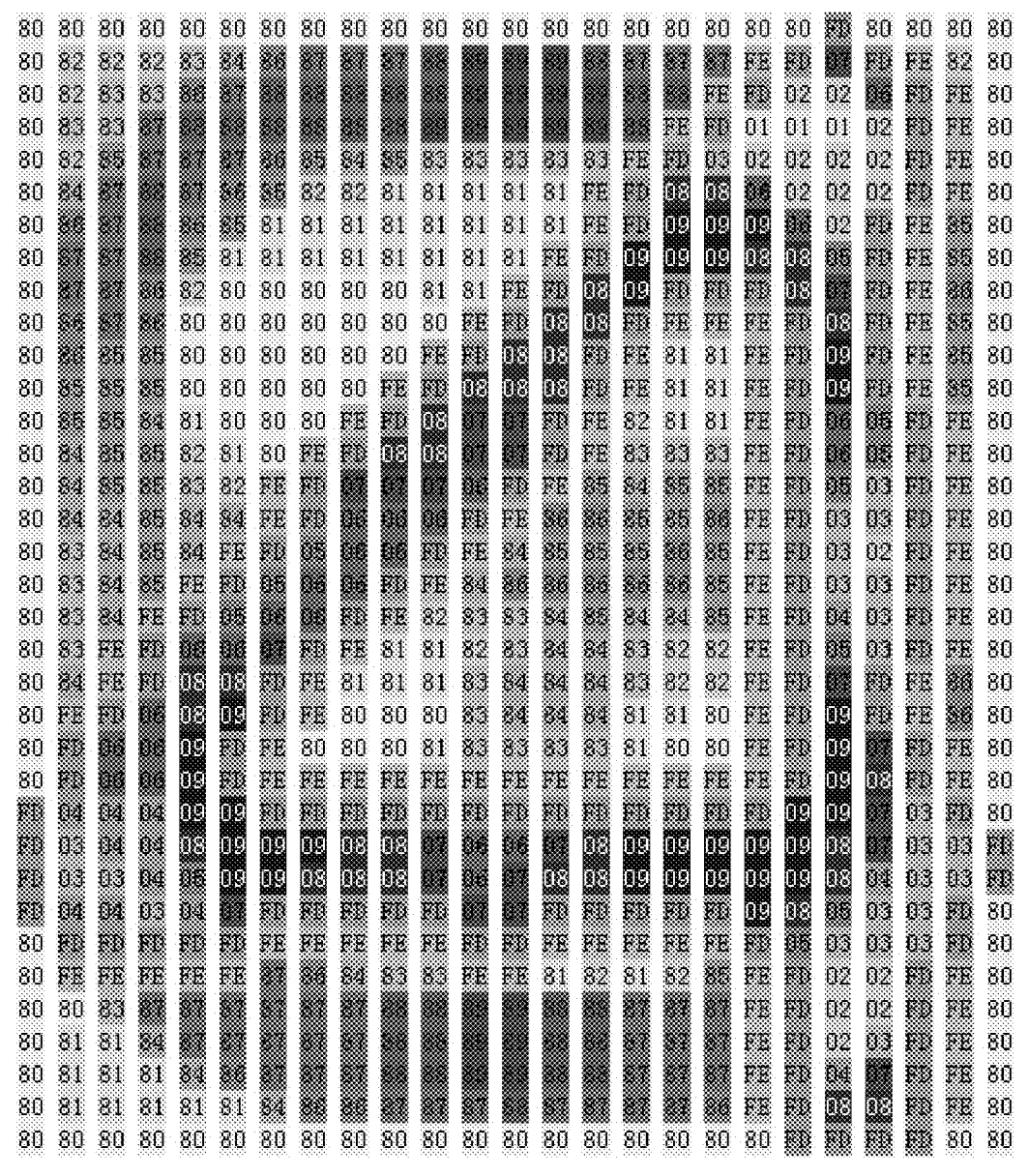
Figure 15:
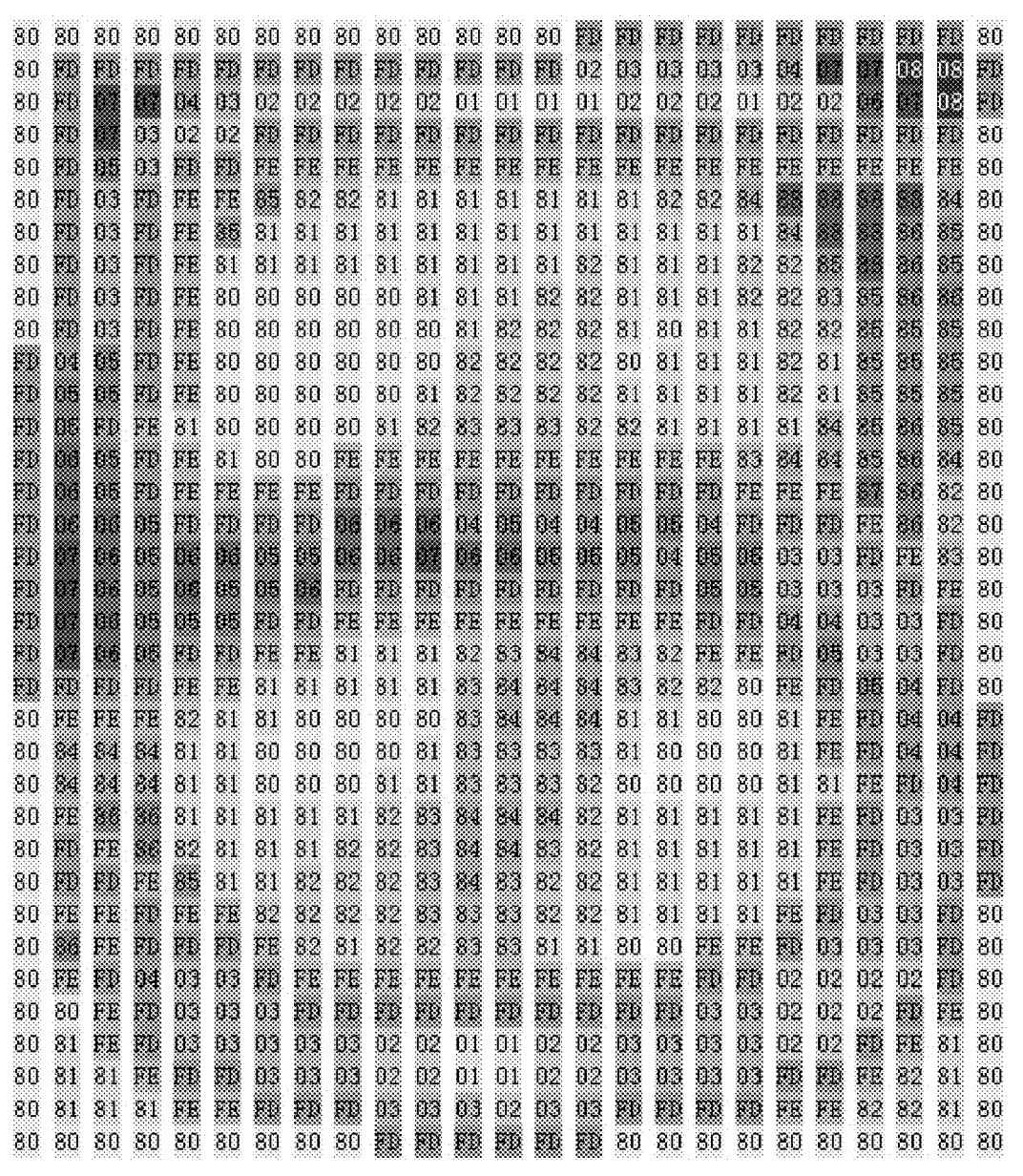
Figure 16:
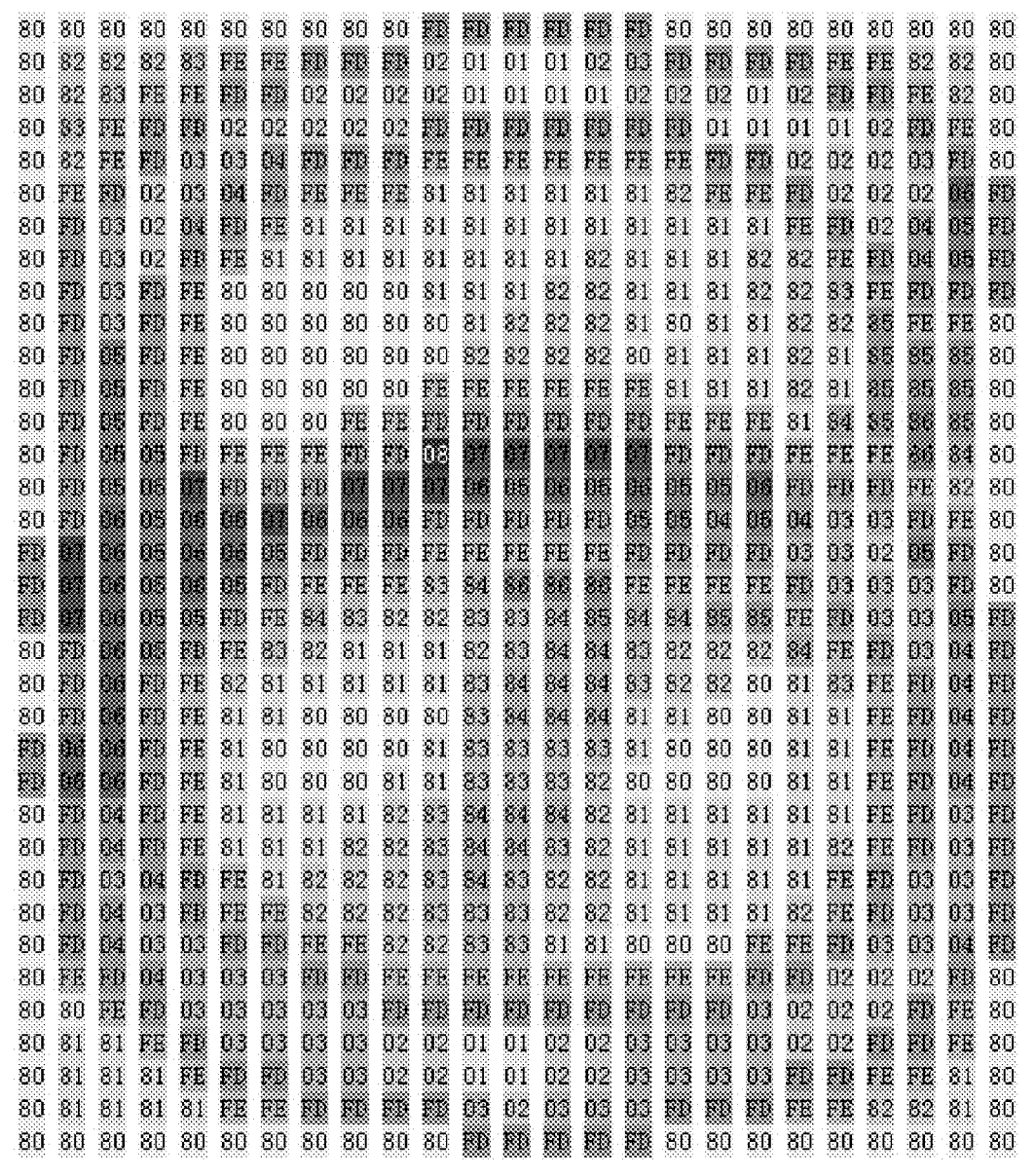
Figure 17:
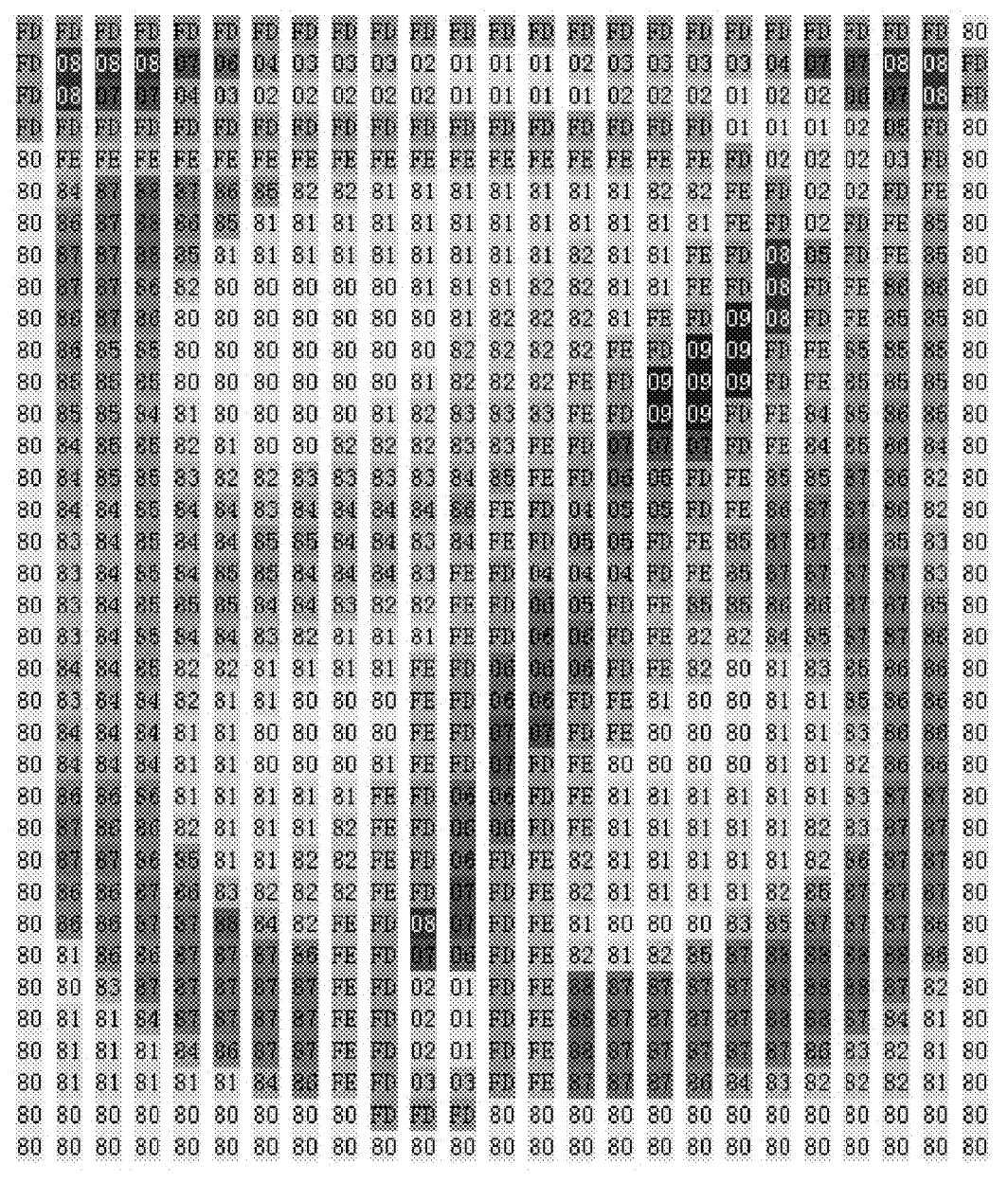
Figure 18:
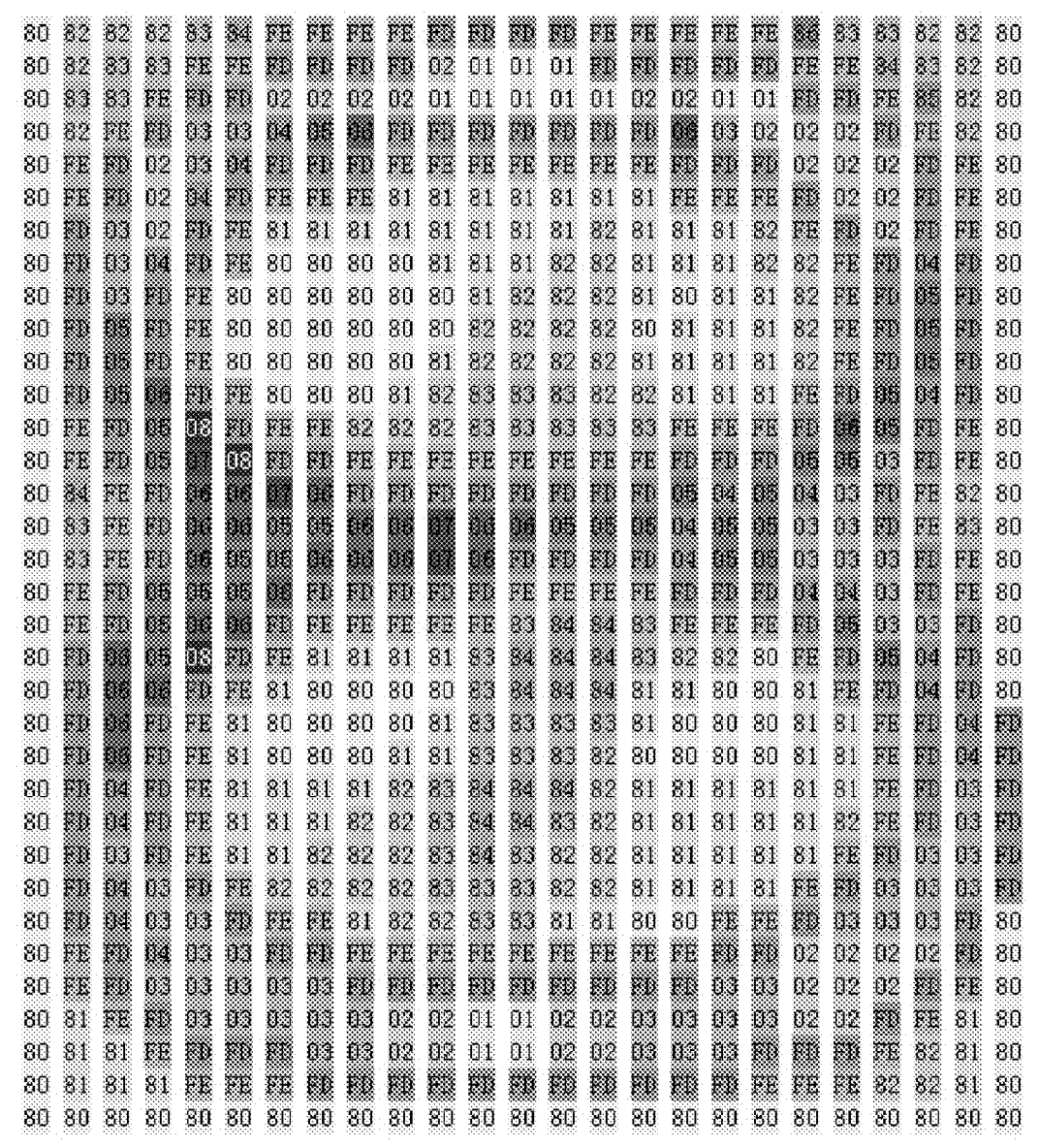
Figure 19:
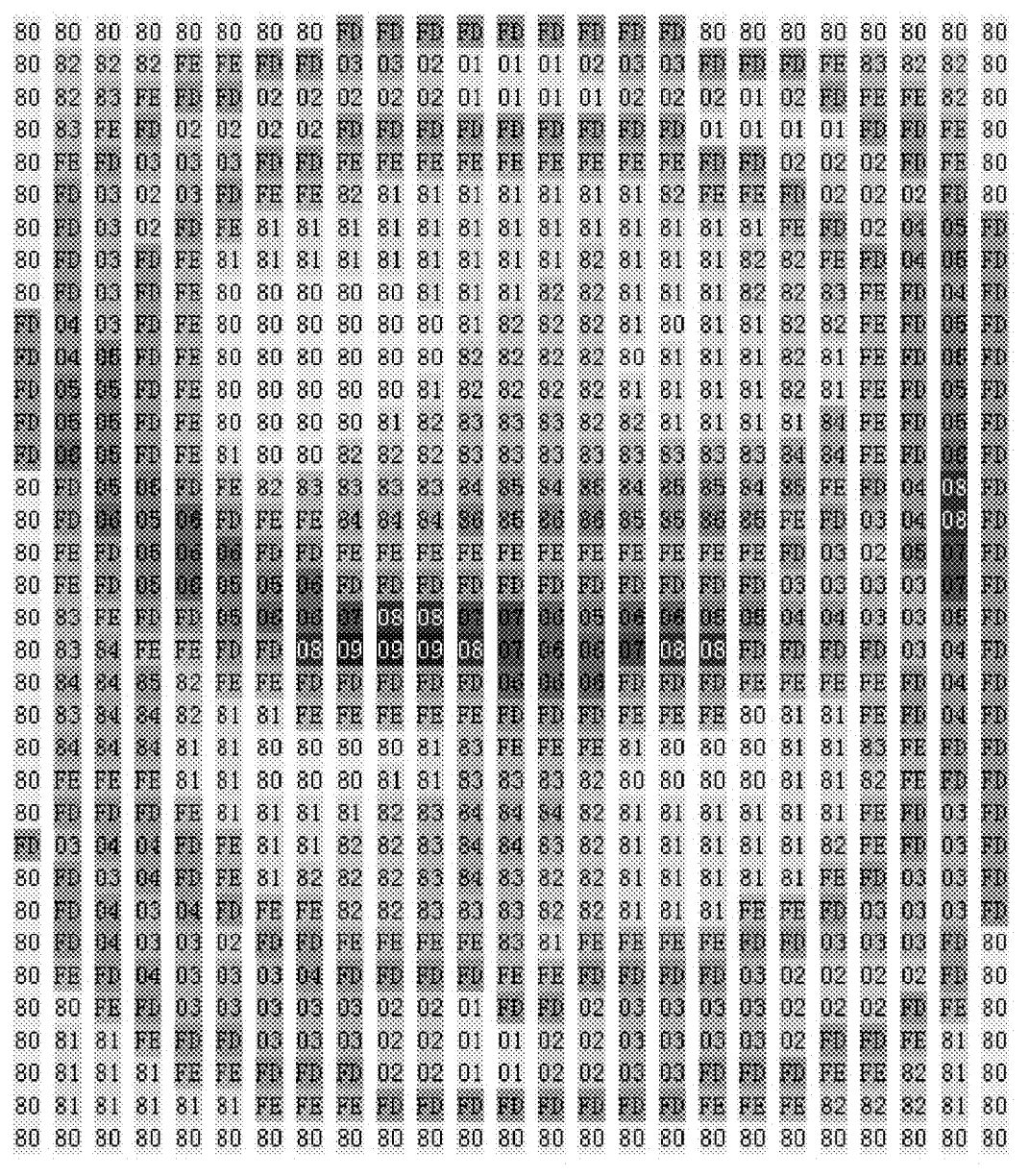

FIGS. 13-19 are schematic diagrams of the weights of the character templates "3", "4", "5", "6", "7", "8" and "9".

DESCRIPTION OF THE EMBODIMENTS

Taking the recognition of numbers of a mechanical character wheel type large water meter as an example, the present invention is further described in detail below with reference to accompanying drawings.

Figure 1:
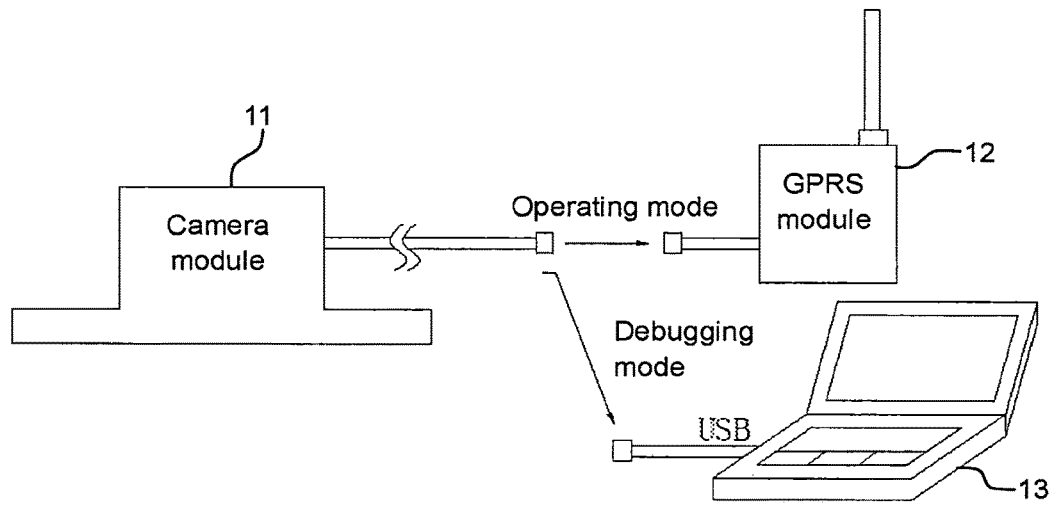
FIG. 1 is a schematic diagram illustrating a recognition device adopted by embodiments of the present invention.

Specifically, a device shown in FIG. 1 can be adopted, a camera module 11 is mounted on the mechanical character wheel type large water meter, the character wheel can be shot by a camera disposed on the device, and an image is transmitted to a computer 13 or a GPRS module 12 via a waterproof cable. The computer 13 is wired-connected to the camera module 11 through USB interfaces, and used for a debugging mode. The GPRS module 12 is wireless-connected to the camera module 11, and used for an operating mode.

The device can upload an original image, a binarized image or a number recognition result to a specified website via the GPRS communication mode. The website can initiate the uploading process by means of a command, or the device can periodically and actively upload. A frame-by-frame transmission method can be adopted for the original image and the binarized image, and the image data are divided into a plurality of frames, wherein each frame does not exceed 1350 bytes, and the frame-by-frame transmission method has an independent verification mechanism, so that the reliability of image transmission can be ensured.

The specific device can be purchased or designed according to circumstances, and device hardware, communication rules and so on are irrelevant to the solution of the present invention, so the descriptions thereof are omitted herein.

First Embodiment

The recognition of the numbers on the character wheel of the water meter includes a preprocessing process and a recognition process of each number.

1. Preprocessing

The preprocessing process is mainly in charge of binarization processing, selection of a recognition region, segmentation of the numbers of the character wheel, etc. The objective of the preprocessing process is to obtain a clear binarized image of each number, i.e. a target character image, that is, the target character image is formed by a background and a target character (i.e. the target number in the present embodiment) to be recognized in the background. The size of the target character image may be equal to the size of a character template image in order to guarantee sufficient coincidence during comparison.

Figure 2:
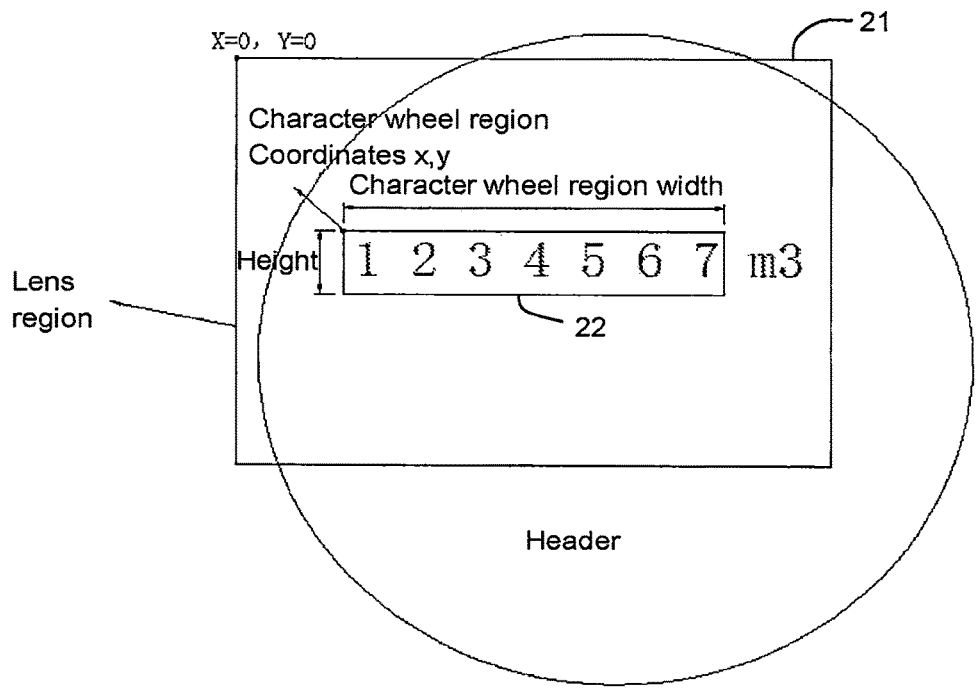
FIG. 2 is a schematic diagram of the arrangement of a character wheel area in the embodiments of the present invention.
Figure 3:
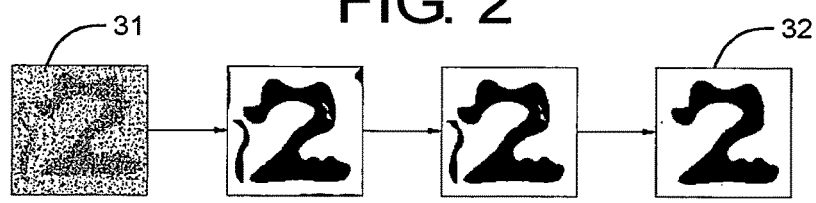
FIG. 3 is a schematic diagram of a preprocessing process in the embodiments of the present invention.

FIG. 2 shows the selection of a character wheel region 22 on the shot image 21. As shown in FIG. 3, after the character wheel is divided according to digits into a plurality of small images 31 which respectively include one number, the smooth, clear binarized image 32 is obtained through some steps, such as mean filtering, binarization processing, morphological filtering and edge cutting.

As other embodiments, the preprocessing process also adopts other technical means, and because the technical means related thereto belong to the prior art, the descriptions thereof are omitted herein.

2. Recognition of each number including generation of character template images and comparative recognition of target character images and character template images.

Generation of Character Template Images

Figure 4:
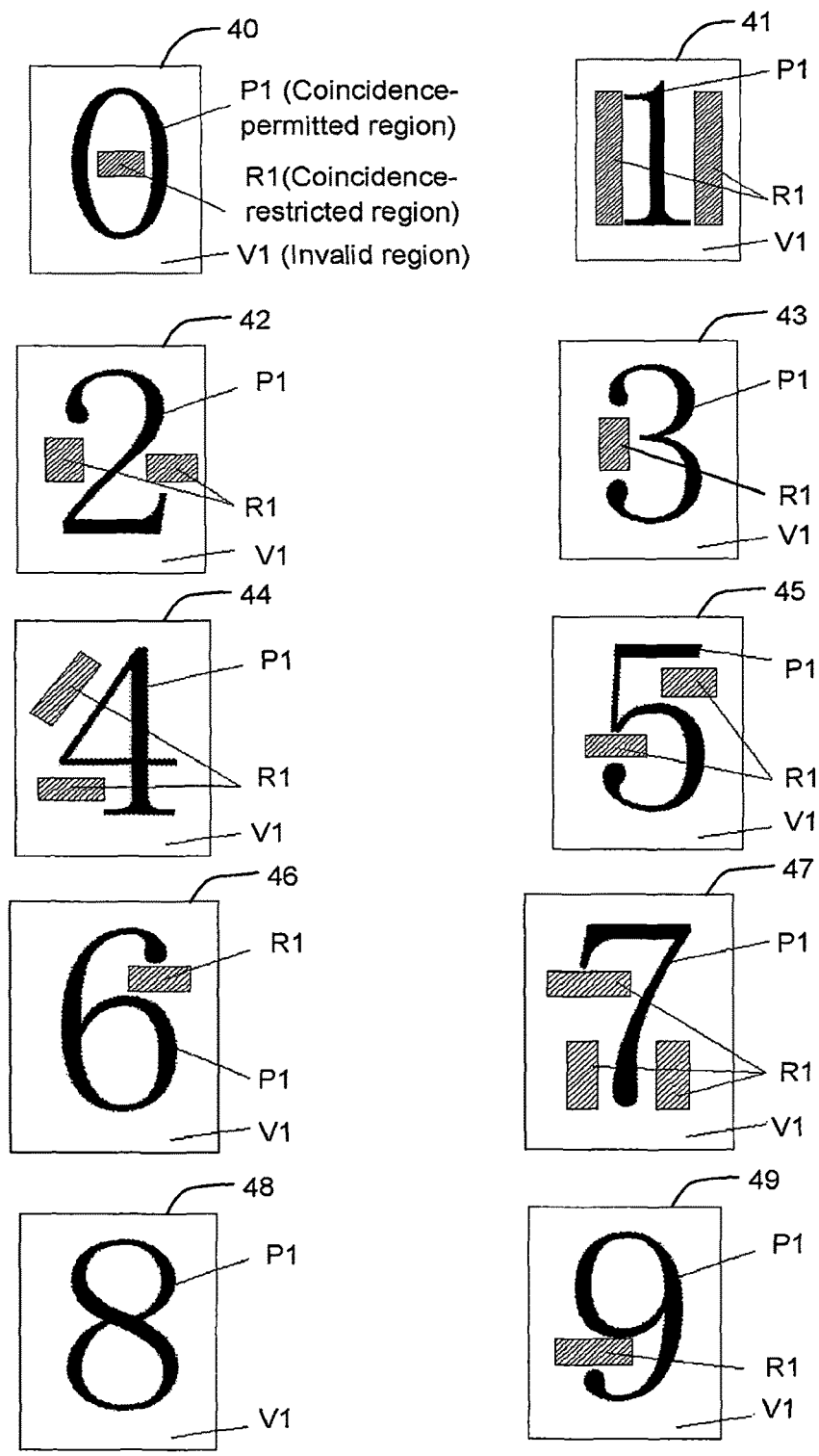
FIG. 4 is a schematic diagram illustrating character templates of "0"-"9" in the embodiments of the present invention.

Character template images adopted by the present embodiment are shown as FIG. 4, and the character template images 40 to 49 are standard, binarized character images, and are each formed by a background and a character template in the background. It can be seen that the character template of each number generally comprises a coincidence-permitted region P1 and a coincidence-restricted region R1, and invalid region V1 is the background.

As the other embodiments, these numbers, such as the character template of "8", may also not be provided with the coincidence-restricted regions.

The coincidence-permitted region P1 is a standard character, i.e. a region which matches the shape of the number itself and is inside the scope of the outline of the number.

The coincidence-restricted region R1 is at least one set region block which is in the character template image and outside of the coincidence-permitted region. While designing the coincidence-restricted regions, the shapes of all the character templates should be considered in order to ensure that these region blocks are key region blocks for differentiating from the other character templates. The number of region block is one or more than one. The shape of the region block can be any shapes, but, for the convenience of calculation and operation, the region block of the coincidence-restricted region is usually designed as rectangles.

The invalid region V1 is all the regions outside the coincidence-permitted region P1 and the coincidence-restricted region R1.

Generation of character template image may be implemented by a variety of manners, such as adding coincidence-restricted regions on the basis of existing character templates. Or the manner mentioned below can be adopted, character templates designed by such manner are based on real images, and undergo "refining" processing, so that recognition is more accurate and reliable, and specifically.

Figure 5:
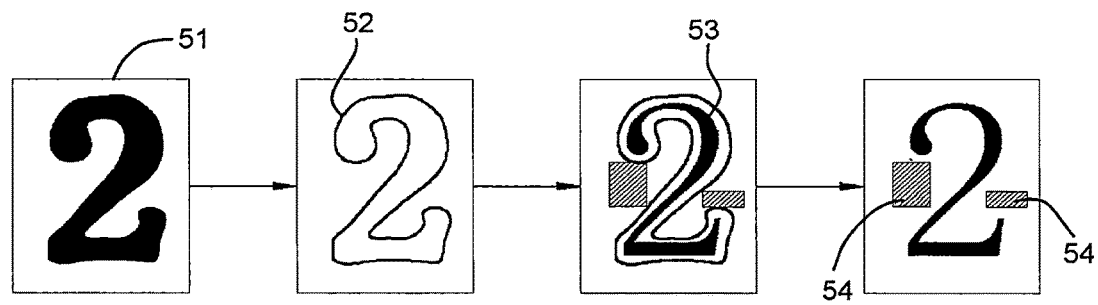
FIG. 5 is a diagram of a character template generation process for "2" in the embodiments of the present invention.

FIG. 5 shows a character template generation process for "2". A character image of the character wheel of the water meter is shot first, so that a clear number region picture is obtained, and the character image is processed to obtain a binarized image 51 of the character. The binarized image 51 is then hollowed to generate a boundary 52, and a line 53 with certain thickness is drawn in the middle portion inside the hollowed image boundary to form a coincidence-permitted region, i.e. a "refined" image of the character. A coincidence-restricted region 54 is then added, and in the fourth step, the boundary is removed, and thus, a character template image is obtained.

Character template images can be generated for the ten numbers from 0 to 9 according to the above-mentioned steps, and thereby a character template library for the ten numbers from 0 to 9 is formed. The generated character template images are stored, and will be called for comparative recognition.

Comparative Recognition

A target character image, i.e. the first number on the character wheel, is respectively compared with the character template images from 0 to 9 to find out a maximum of a coincidence area between the target character in the target character image and the character template in one of the character template images, and when the coincidence area meets a preset condition, it is determined that the target character to be recognized is the character in the corresponding character template image.

Different physical quantities can be used for expressing the size of the coincidence area. In particular, the present embodiment adopts a coincidence rate to represent the size of the coincidence area, and then the number corresponding to the character template image with a maximum coincidence rate is the target character, i.e. the first number on the character wheel. With regard to the calculation of the coincidence rate, the rule is that the more the numbers of the pixels coinciding with the coincidence-permitted region is, the higher the coincidence rate is, and that the more the numbers of pixels not coinciding with the coincidence-restricted region is, the higher the coincidence rate is.

A specific calculation method for the coincidence rate is as follows: let the number of pixels of the coincidence-permitted region in the character template image be a, and let the number of pixels of the coincidence-restricted region in the character template image be b; in the process of comparison, let the number of the pixels of the target character image coinciding with the coincidence-permitted region be a', the number of the pixels of the target character image not coinciding with the coincidence-restricted region be b', and then the coincidence rate is:

$$100\% * (a'+b')/(a+b).$$

A specifically adopted formula can also be $100\% * k(a'+b')/(a+b)$. By adjusting the coefficient k, $k(a'+b')/(a+b)$ can reach 1 under the ideal maximum condition, thus further increasing the precision of recognition.

The specific formula for the coincidence rate can also be $100\% * (a'/a + b'/b)$ or $100\% * (a'+b')/\text{certain fixed value}$, or the specific formula for the coincidence rate may be formed by setting of weight values for a' and b', etc.

In the comparison process:

Each time when comparison is carried out, a target character image and all the character template images in the character template library are involved. The target character image is compared with all the character template images in the character template library one by one, and the coincidence rate which is obtained when each character template image participates in comparison is calculated.

The corresponding coincidence rates between the target character image and all the character template images can then be obtained, and when a maximum coincidence rate among the coincidence rates is found, it is determined that the target character to be recognized is the character of the corresponding character template image.

When the comparative recognition of the target character image and one character template image is carried out, the target character image is directly superposed on the character template image, and the coincidence rate which is calculated is the coincidence rate between the target character image and the character template image.

3. After the recognition of the first number on the character wheel is complete, repeating the above-mentioned comparative recognition process to gradually fulfil the recognition of all the numbers on the character wheel.

Second Embodiment

The difference of the present embodiment from the first embodiment is a different comparative recognition manner: each time when comparison is carried out, a target character image and part of character template images are involved, that is, not all character template images in the character template library may be involved in the process of recognition.

The target character image is sequentially compared with the character template images participating in comparison; if it is discovered that the coincidence rate of one character template image participating in comparison is high and greater than a set value, then it can be directly determined that the character corresponding to the character template image is the target character, and the target character image does not need to be compared with the other character template images any more.

Specifically, when the target character image is compared with one character template image, the target character image is directly superposed on the character template image, the coincidence rate between the target character image and the character template image is synchronously calculated, and the coincidence rate is compared with a set value.

If the coincidence rate between the target character image and one character template image exceeds the set value, then the operation of comparison is stopped, and it is determined that the target character to be recognized is the character of the character template image.

The set value can be set according to the specific formula for the coincidence rate.

Third Embodiment

Figure 6:
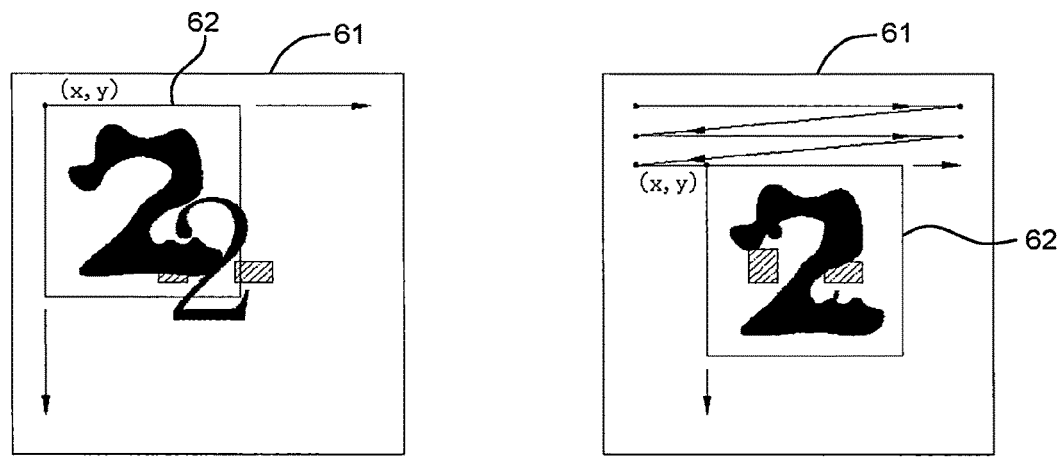
FIG. 6 is a schematic diagram of a scanning mode in the third embodiment and the fourth embodiment of the present invention.

The difference of the present embodiment from the first embodiment is also a comparative recognition manner. During one-by-one comparison, the target character image is not directly superposed on a character template image, but a scanning manner is adopted. As shown in FIG. 6, the character template image is first placed in a large region 61. The target character image 62 is then put at the upper left corner of the region, and is shifted according to a sequence from the left to the right and from the top to the bottom. The target character image 62 is moving by a pixel each time, and the coincidence rates are compared once when the target character image is shifted each time. After whole shifting operation is complete, a maximum coincidence rate is stored as the coincidence rate of the character template image.

Specifically, a target character image is respectively compared with all of the character template images in the character template library.

When the target character image is compared with one character template image, the character template image is placed in a region, and the coverage of the region is larger than the size of the character template image. The target character image is used for scanning in the region, and the coverage of scanning is at least from an initial position to the position where the character template image is located. The coincidence rate is synchronously calculated each scan, and then the maximum value among the coincidence rates calculated each time is adopted as the coincidence rate between the target character and the character template image.

The corresponding coincidence rates between the target character image and all the character template images are sequentially obtained. When a maximum coincidence rate among the corresponding coincidence rates is found, the target character to be recognized is determined to be the character of the corresponding character template image.

The scanning manner is that the target character image 62 (the small square block in FIG. 6) is used for scanning in the entire large region 61 (the large square block in FIG. 6) to obtain the maximum of the coincidence rates in several times of scanning. Scanning can be carried out until the entire region is scanned or only a certain range is scanned, at least from the initial position to the position where the character template is located, ensuring that the target character image covers a part region of the region where the character template image is located, for example, scanning from the upper left corner to the central portion of the region. The scanning manner can be a first-transverse-then-vertical manner or a diagonal manner, etc.

The reason of adopting the scanning manner is that because of installation and shooting, the target character may be deviated from the central position of the target character image. If the direct superposition method is adopted, then the error of superposition will be great, leading to an inaccurate final comparison result. The scanning manner can reduce the error, guaranteeing the accuracy of the result.

Figure 7:
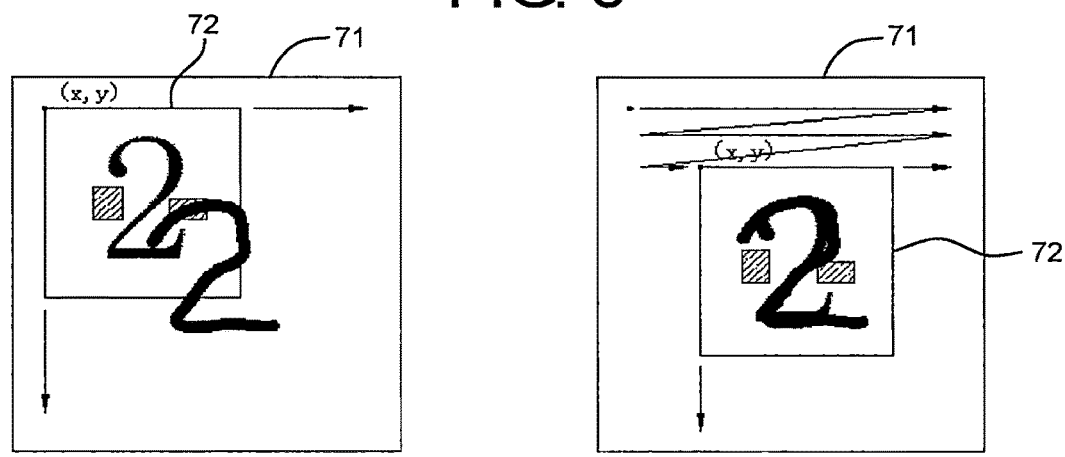
FIG. 7 is a schematic diagram of another scanning mode.

In addition, when the scanning manner is adopted, the target character image can also be placed in a large region 71, and a character template image 72 is used for scanning in the large region 71, as shown in FIG. 7. Because the region of the target character image is fixed, compared with the above-mentioned mode which uses the target character image to scan, the scanning manner can reduce operation and decrease algorithm complexity.

Fourth Embodiment

Similar to the third embodiment and the second embodiment, the present embodiment adopts the scanning manner, and moreover, comparison may not involve all the character template images in the character template library.

Specifically, a target character image is respectively compared with part of character template images in the character template library.

When the target character image is compared with one character template image, the character template image is placed in a region, and the coverage of the region is larger than the size of the character template image. The target character image is used for scanning in the region, the coverage of scanning is at least from an initial position to the position where the character template image is located, ensuring that the target character image covers a part region of the region where the character template image is located, the coincidence rate between the target character image and the character template image is synchronously calculated, and the coincidence rate is compared with a set value.

If the coincidence rate between the target character image and one character template image exceeds the set value, then comparison is stopped, and the target character to be recognized is determined to be the character of the character template image.

As described in the third embodiment, the scanning manner may also be that the target character image is placed in a large region, and a character template image is used for scanning in the large region.

A variety of specific embodiments are given above, but the present invention is not limited to the described embodiments. The basic idea of the present invention lies in the above-mentioned basic solution, that is:

An image is first preprocessed, so that a target character image is obtained, and the target character image comprises a target character to be recognized.

The target character image is then respectively compared with set character template images to find out a maximum coincidence area between the target character in the target character image and a character template in one character template image, and when the coincidence area meets a preset condition, the target character to be recognized is determined to be the character in the corresponding character template image. Design of the coincidence-restricted region in the character template is very critical when designing the character template. The shapes of all the character templates should be comprehensively taken into consideration in order to ensure that the region block of a coincidence-restricted region is a key region block which can be differentiated from the other character templates.

In the foregoing embodiments, the size of the coincidence area is represented by the coincidence rate. The rule of coincidence rate calculation is that, the more the number of the pixels coinciding with the coincidence-permitted region is, the higher the coincidence rate is, and that the more the number of the pixels not coinciding with the coincidence-restricted region is, the higher the coincidence rate is. It is also pointed out above that weights can also be introduced during coincidence rate calculation. A method of coincidence rate calculation with weights is introduced in detail below.

The method of coincidence rate calculation with weights includes three aspects: division of character template regions, weight generation and coincidence rate calculation. Division of character template regions and coincidence rate calculation are first introduced below, and finally, weight generation is introduced.

1. Division of Character Template Regions

Figure 8:
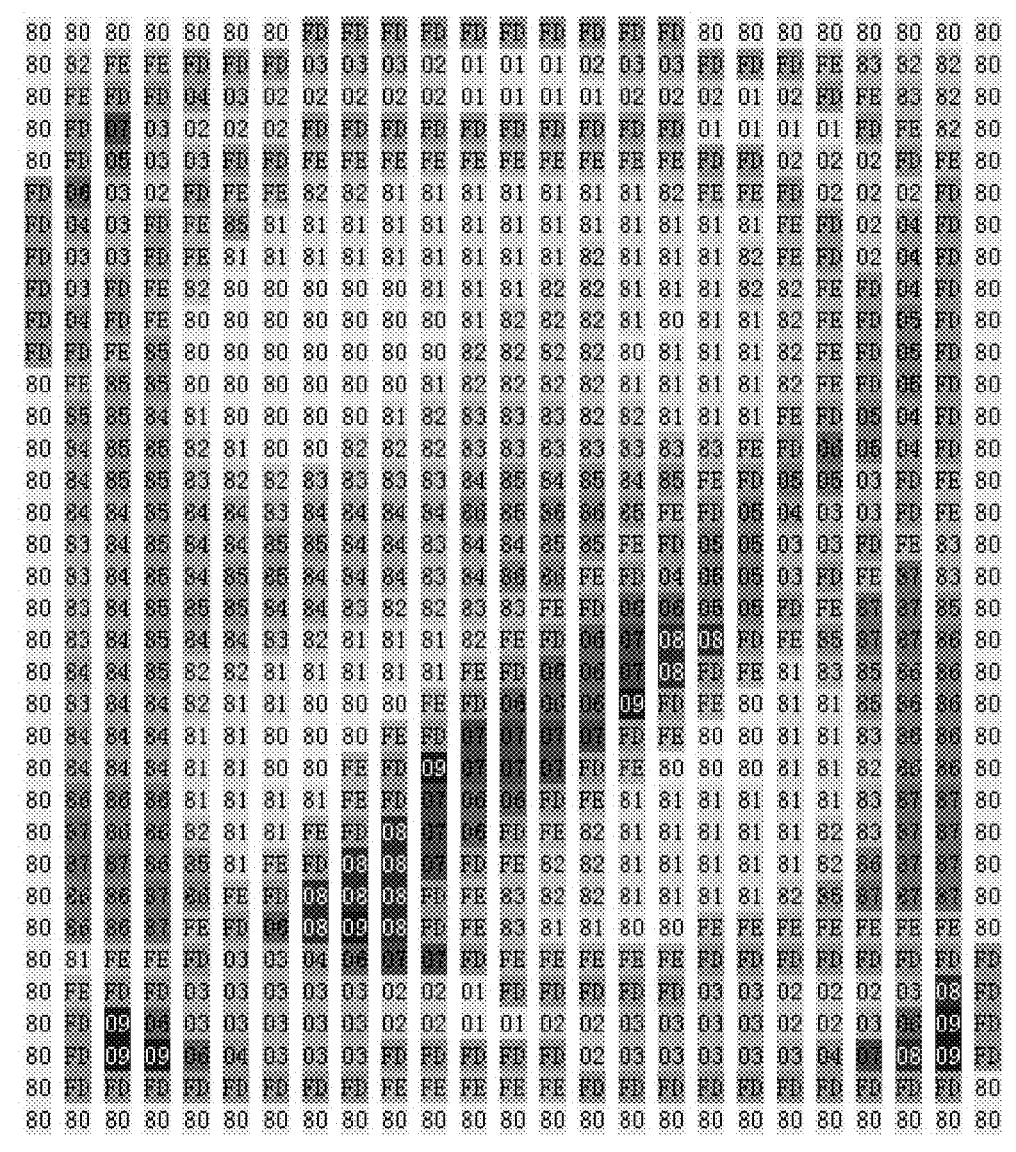

The division of a coincidence-restricted region is different from the foregoing embodiments. As shown in FIG. 8, a coincidence-permitted region and a coincidence-restricted region are arranged on a character template, the outline of the coincidence-permitted region is the same as in FIG. 4 while the shape of the coincidence-restricted region is not the same as in FIG. 4. The shape of the coincidence-restricted region in FIG. 8 is not a rectangular region block, but includes all the regions except the coincidence-permitted region. All these regions serve as key regions for differentiating from other character templates. Moreover, according to difference of "key" degrees, different weights are respectively given to these regions; and likewise, the coincidence-permitted region is also divided into regions with different weights.

It is assumed that the stroke of a target character is black, a background is white, the coincidence-permitted region on the character template is black, and the coincidence-restricted region is white. The more coinciding points between the black points of the target character and the black points of the character template there are and the more coinciding points between the white points of the target character and the white points of the character template there are, the higher the coincidence rate is.

For example, ten numbers from 0 to 9 are recognized.

Figure 9:
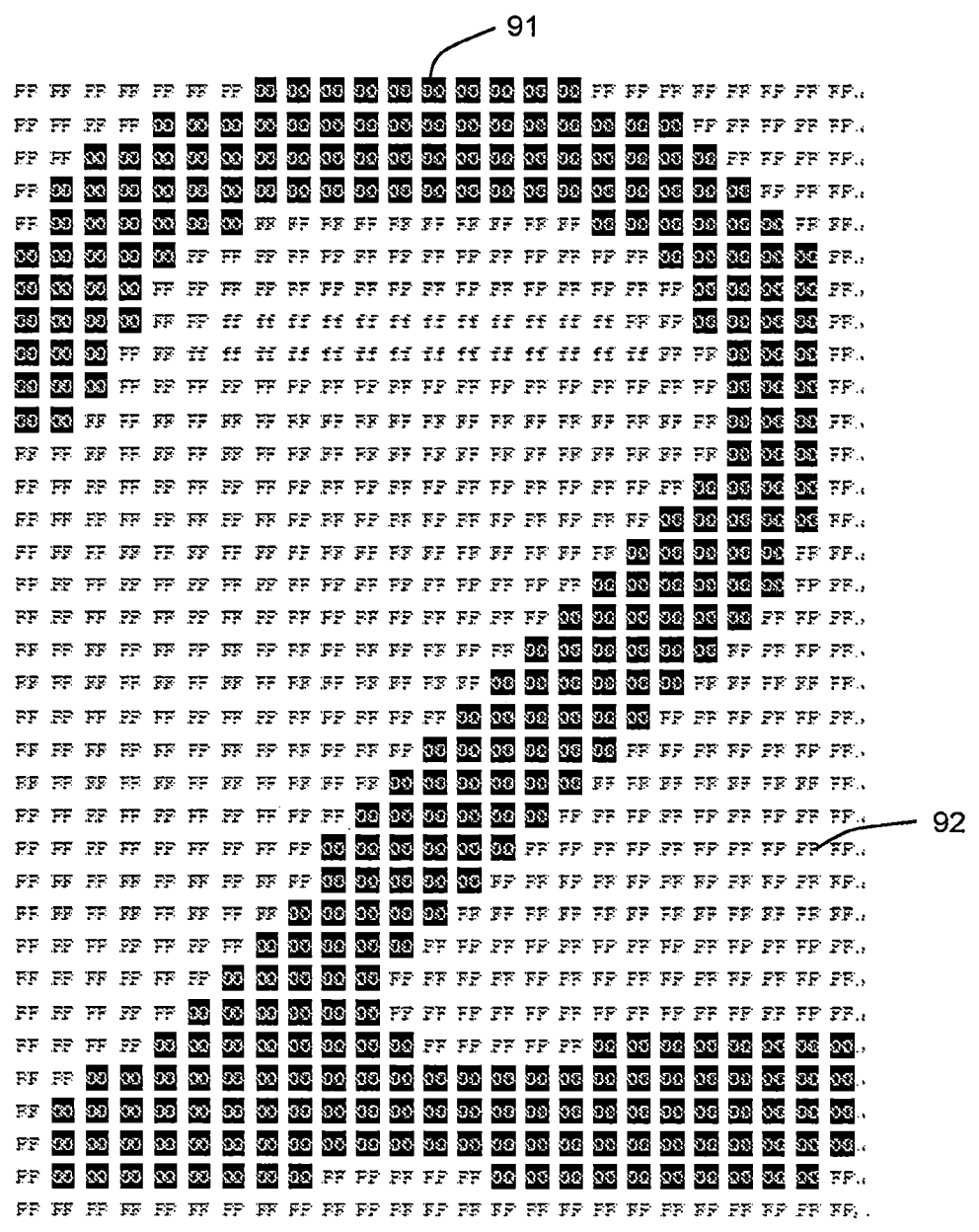

FIG. 9 shows an original character template for "2", the coincidence-permitted region is generated in the black stroke portion, and the coincidence-restricted region is generated in the white portion. FIG. 8 is a schematic diagram of the weight of the character template "2". In order to embody the greatest difference between the number "2" and the other nine numbers in the black portions, the character template for the number "2" is sequentially compared with the other nine numbers, wherein the black portion which coincides with the black portions of the other characters multiple times is a relatively secondary coincidence-permitted region, which is the light-colored gray region (the region coded as 01, 02 and 03) in FIG. 8. The portion which does not coincide with the other nine numbers is a primary coincidence-permitted region, which is the deep-colored gray region (the region coded as 04, 05, 06, 07, 08 and 09) shown in FIG. 8.

The coincidence-restricted region is generated in the white background portion. In order to embody the greatest difference between the number "2" and the other nine numbers in the white portions, the character template for the number "2" is sequentially compared with the other nine numbers, wherein the white portion which coincides with the white regions of the other characters multiple times is a relatively secondary coincidence-restricted region, which is the light-colored red region (the region coded as 80, 81 and 82) shown in FIG. 8. The portion which does not coincide with the white regions of the other nine numbers is a primary coincidence-restricted region, which is the deep-colored red region (the region coded as 84, 85, 86 and 87) shown in FIG. 8.

The coincidence-restricted region also includes an invalid region, and the invalid region is a boundary region between the black portion and white portion of the original character template, and is the blue region shown in FIG. 8, coded as FD and FE.

2. Coincidence Rate Calculation

Known from the above analysis, the higher the weights of the more primary coincidence-permitted region and coincidence-restricted region are, the greater the influence in comparison is; the lower the weights of the more secondary coincidence-permitted region and coincidence-restricted region are, the less the influence in comparison is; and the weight of the invalid region is 0. Therefore, the introduction of the weight concept can define the primary and secondary degrees of the coincidence-permitted/coincidence-restricted regions. That is to say, for one character template, the point with higher weight is more "unique", and the "recognition degree" of the point is higher. Therefore, coincidence rates can be conveniently calculated as long as the weight of each point is configured while the character template is designed.

Definition: coincidence rate=sum of weights of all coinciding points/sum of weights of all points in character template.

All coinciding points include coinciding points of a coincidence-permitted region and coinciding points of a coincidence-restricted region. Since the coincidence-permitted region is black and the coincidence-restricted region is white in the present embodiment, all the coinciding points are the coinciding black points and the coinciding white points.

3. Weight Generation

An original character template is given first, as shown in FIG. 9, an invalid region is then marked in the region of the boundary between black points and white points in the original character template, each row in the black point region and a row in the white point region are respectively marked, and the black point around which at least one white point exists and the white point around which at least one black point exists are marked as invalid points. The weight of one point of the coincidence-permitted region and the weight of one point of the coincidence-restricted region are formed by a cardinal number and an increment, as shown below, wherein $q_x$ is the weight of one black point x, the cardinal number is $k_1$, and the increment is $t_1*n$; and the weight of one white point y is $q_y$, the cardinal number is $k_2$, and the increment is $t_2*m$.

$$q_x = k_1 + t_1*n$$

$$q_y = k_2 + t_2*m$$

Wherein n is the number of points of the other nine character templates not coinciding with the black point x at the same position, for example, if x is one black point, there are five white points at the same position in the other nine character templates, and then n is 5. $t_1$ is an increment coefficient of the coincidence-permitted region.

Wherein m is the number of points of the other nine character templates not coinciding with the white point y at the same position, for example, if y is the white point, there are three black points at the same position in the other nine character templates, and then m is 3. $t_2$ is the increment coefficient of the coincidence-restricted region.

It can be seen that, the higher m and n are, the more "unique" the corresponding points are and the higher the "recognition degree" is.

Figure 10:
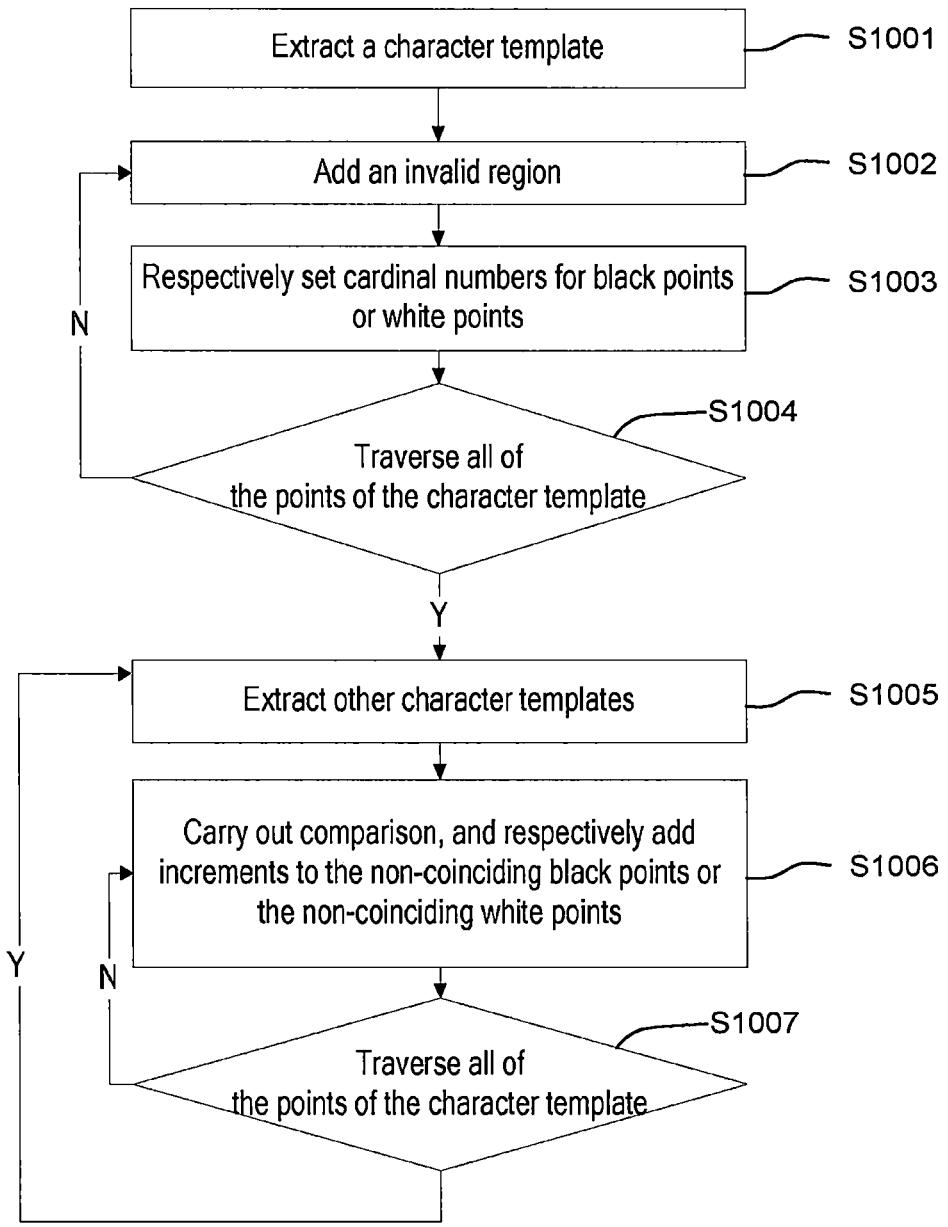
FIG. 10 is a flow chart of the generation of a character template with a weight.

The specific implementation process of a character template for one number is shown as FIG. 10. By performing step S1001, one character template is extracted first. By performing step S1002 to step S1004, black point values and white point values are respectively set as cardinal numbers, and an invalid region is marked. By performing step S1005, the other nine character templates are then sequentially extracted. By performing step S1006 to step S1007, the character template is compared with the character template of each number at each same point position, the increment of each point is determined, and weights are obtained. The specific values of the cardinal numbers and increments of the white points and the black points can be adjusted according to specific conditions.

As shown in FIG. 8, each point in the character template is coded. Coding is intended to facilitate calculation, each point in the character template is composed of an 8-bit binary number, the highest bit of the white points is 1, the highest bit of the black points is 0, and the low 7-bit absolute value of the code represents an actual weight value of the point. The point values of the invalid region are 0xfe and 0xfd (but the weight values are zero).

The weight generation process for the character template "2" is given above, and FIGS. 11-19 also give the schematic diagrams of the weights of the character templates "0", "1", "3", "4", "5", "6", "7", "8" and "9".

Characters which can be recognized by the method of the present invention include numbers, letters, symbols, etc. The recognizable field is not limited to the recognition of water meters, the readings of character wheels of meters, such as electricity meters, gas meters, heat meters, etc., can also be recognized, and moreover, the method should also be extended to all fields requiring the recognition of numbers, letters, symbols and other characters, such as license plates.

According to the teaching of the present invention, those skilled in the art can design various transformed models, formulas and parameters without doing creative work. Without departing the principle and spirit of the present invention, variations, modifications, replacements and transformations which are carried out on the embodiments shall fall within the protection scope of the present invention.

What is claimed is:

1. A character information recognition method based on image processing, applicable to a device having a camera module and a computer, wherein the camera module is mounted on a water meter, wherein the character information recognition method comprises the steps of:
    (a) collecting images of a character wheel of the water meter using the camera module, and obtaining target character images by image preprocessing through the computer, wherein each of the target character images is formed by a background and a target character to be recognized on the background;
    (b) for one target character image, through the computer, sequentially comparing the target character image with character template images in a character template library to find out a maximum of a coincidence area between the target character in the target character image and a character template in one character template image, and determining the target character to be recognized as a character in a corresponding character template image when the coincidence area meets a preset condition, so as to obtain a number recognition result of the character wheel; and
    (c) uploading the number recognition result,
    wherein the character template images within a specified range constitute the character template library; each character template image formed by a background and a character template at a set position on the background is a standard binarized character image; the character template of each character template image comprises a coincidence-permitted region, and the character template of at least one character template image comprises a coincidence-restricted region; the coincidence-permitted region is a set standard character; and the coincidence-restricted region is outside of the coincidence-permitted region and is a key region block for differentiating from the other character templates,
    wherein the step (b) comprising: for one target character image, while the target character image is sequentially compared with the character template images in the character template library, synchronously calculating a coincidence rate between the target character image and each character template image participating in comparison; and determining the magnitude of the coincidence rate, wherein when the magnitude of the coincidence rate reaches a default condition, the target character to be recognized is recognized as the character of the corresponding character template image,
    wherein the coincidence rate is positively related to a number of pixels of the target character image coinciding with the coincidence-permitted region, and to a number of pixels of the target character image not coinciding with the coincidence-restricted region.

2. The character information recognition method based on image processing according to claim 1, wherein the step (b) comprising: respectively comparing the target character image with all of the character template images in the character template library;
    directly superposing the target character image on one character template image, and synchronously calculating the coincidence rate between the target character image and the character template image, when the target character image is compared with one character template image; and
    sequentially obtaining corresponding coincidence rates between the target character image and all of the character template images, and determining the target character to be recognized as the character of the corresponding character template image when fining a maximum coincidence rate.

3. The character information recognition method based on image processing according to claim 2, wherein a coincidence rate calculation formula is: $k \cdot (a'+b')/(a+b)$, the number of pixels of the coincidence-permitted region in the character template image is a, and the number of pixels of the coincidence-restricted region is b; in the process of comparison, the number of the pixels of the target character image coinciding with the coincidence-permitted region is a', the number of the pixels of the target character image not coinciding with the coincidence-restricted region is b', and k is a coefficient.

4. The character information recognition method based on image processing according to claim 1, wherein the step (b) comprising: respectively comparing the target character image with part of the character template images in the character template library;
    directly superposing the target character image on one character template image, synchronously calculating the coincidence rate between the target character image and the character template image, and comparing the coincidence rate with a set value when the target character image is compared with one character template image;

stopping comparison, and determining the target character to be recognized as the character of the corresponding character template image if the coincidence rate between the target character image and one character template image exceeds the set value.

5. The character information recognition method based on image processing according to claim 4, wherein a coincidence rate calculation formula is: k (a'+b')/(a+b), the number of pixels of the coincidence-permitted region in the character template image is a, and the number of pixels of the coincidence-restricted region is b; in the process of comparison, the number of the pixels of the target character image coinciding with the coincidence-permitted region is a', the number of the pixels of the target character image not coinciding with the coincidence-restricted region is b', and k is a coefficient.

6. The character information recognition method based on image processing according to claim 1, wherein the step (b) comprising: respectively comparing the target character image with all of the character template images in the character template library;

placing the character template image within a region when the target character image is compared with one character template image, wherein the coverage of the region is larger than the size of the character template image; using the target character image to scan in the region, wherein a coverage of scanning ensures that the target character image covers a part region of the region, where the character template image is located, synchronously calculating the coincidence rate of each scan, and then adopting the maximum value among the coincidence rates calculated each time as the coincidence rate between the target character and the character template image; and sequentially obtaining corresponding coincidence rates between the target character image and all of the character template images, and determining the target character to be recognized as the character of the corresponding character template image when finding a maximum coincidence rate among the corresponding coincidence rates.

7. The character information recognition method based on image processing according to claim 6, comprising a method for generating one character template image for one character which comprises: first shooting an image of the character on the character wheel of the water meter through the camera module, and performing a image processing to obtain a binarized image of the character through the computer; then hollowing the binarized image to generate a boundary through the computer, and drawing a line with a set width in the central portion within the boundary to form the coincidence-permitted region through the computer; then adding the coincidence-restricted region outside the boundary through the computer; and removing the boundary to obtain one of the character template images through the computer.

8. The character information recognition method based on image processing according to claim 1, wherein the step (b) comprising: respectively comparing the target character image with all of the character template images in the character template library;

placing the target character image within a region when the target character image is compared with one character template image, wherein the coverage of the region is larger than the size of target character image; using the character template image to scan in the region, wherein a coverage of scanning ensures that the character template image covers a part region of the region where the target character image is located, synchronously calculating a coincidence rate of each scan, and then adopting the maximum value among the coincidence rate of each scan as the coincidence rate between the target character and the character template image; and sequentially obtaining corresponding coincidence rates between the target character image and all of the character template images, and determining the target character to be recognized as the character of the corresponding character template image when finding a maximum coincidence rate among the corresponding coincidence rates.

9. The character information recognition method based on image processing according to claim 8, comprising a method for generating one character template image for one character which comprises: first shooting an image of the character on the character wheel of the water meter through the camera module, and performing a image processing to obtain a binarized image of the character through the computer; then hollowing the binarized image to generate a boundary through the computer, and drawing a line with a set width in the central portion within the boundary to form the coincidence-permitted region through the computer; then adding the coincidence-restricted region outside the boundary through the computer; and removing the boundary to obtain one of the character template images through the computer.

10. The character information recognition method based on image processing according to claim 1, wherein the step (b) comprising: respectively comparing the target character image with part of character template images in the character template library;

placing the character template image in a region when the target character image is compared with one character template image, wherein a coverage of the region is larger than the size of the character template image; using the target character image to scan in the region, wherein a coverage of scanning ensures that the target character image covers a part region of the region where the character template image is located, synchronously calculating the coincidence rate between the target character image and the character template image, and comparing the coincidence rate between the target character image and the character template image with a set value;

stopping comparison, and determining the target character to be recognized as the character of the corresponding character template image if the coincidence rate between the target character image and one character template image exceeds the set value.

11. The character information recognition method based on image processing according to claim 10, wherein the coincidence rate is equal to sum of weights of all coinciding points divided by sum of weights of all points in character template; all the coinciding points include coinciding points of the coincidence-permitted region and coinciding points of the coincidence-restricted region; with regard to one point in the character template, the weight of the point in the character template is determined according to whether points which are at the same position as the point are located in the same region in other character templates, wherein the more character templates in which the points at the same position are located in the same region there are, the lower the weight of the point is, otherwise the less character templates in which the points at the same position are located in the same region there are, the higher the weight of the point is, and the same region represents that the points in the other character templates and the point in the character template are located in the coincidence-permitted region at the same time or located in the coincidence-restricted region at the same time.

12. The character information recognition method based on image processing according to claim 1, wherein the step (b) comprising: respectively comparing the target character image with part of character template images in the character template library;
placing the target character image in a region when the target character image is compared with one character template image, wherein a coverage of the region is larger than the size of the character template image; using the character template image to scan in the region, wherein a coverage of scanning ensures that the character template image covers a part region of the region where the target character image is located, synchronously calculating the coincidence rate between the target character image and the character template image, and comparing the coincidence rate between the target character image and the character template image with a set value;
if the coincidence rate between the target character image and one character template image exceeds the set value, then stopping comparison, and determining the target character to be recognized as the character of the character template image.

13. The character information recognition method based on image processing according to claim 12, wherein the coincidence rate is equal to sum of weights of all coinciding points divided by sum of weights of all points in character template; all the coinciding points include coinciding points of the coincidence-permitted region and coinciding points of the coincidence-restricted region; with regard to one point in the character template, the weight of the point in the character template is determined according to whether points which are at the same position as the point are located in the same region in other character templates, wherein the more character templates in which the points at the same position are located in the same region there are, the lower the weight of the point is, otherwise the less character templates in which the points at the same position are located in the same region there are, the higher the weight of the point is, and the same region represents that the points in the other character templates and the point in the character template are located in the coincidence-permitted region at the same time or located in the coincidence-restricted region at the same time.

14. The character information recognition method based on image processing according to claim 1, wherein a coincidence rate calculation formula is: k (a'+b')/(a+b), the number of pixels of the coincidence-permitted region in the character template image is a, and the number of pixels of the coincidence-restricted region is b; in the process of comparison, the number of the pixels of the target character image coinciding with the coincidence-permitted region is a', the number of the pixels of the target character image not coinciding with the coincidence-restricted region is b', and k is a coefficient.

15. The character information recognition method based on image processing according to claim 1, wherein the coincidence rate is equal to sum of weights of all coinciding points divided by sum of weights of all points in character template; all the coinciding points include coinciding points of the coincidence-permitted region and coinciding points of the coincidence-restricted region; with regard to one point in the character template, the weight of the point in the character template is determined according to whether points which are at the same position as the point are located in a same region in other character templates, wherein the more character templates in which the points at the same position are located in the same region there are, the lower the weight of the point is, otherwise the less character templates in which the points at the same position are located in the same region there are, the higher the weight of the point is, and the same region represents that the points in the other character templates and the point in the character template are located in the coincidence-permitted region at the same time or located in the coincidence-restricted region at the same time.

16. The character information recognition method based on image processing according to claim 15, wherein the weight of each point of each character template is formed by a cardinal number and an increment, the cardinal number is a fixed value, and the increment is a variable value.

17. The character information recognition method based on image processing according to claim 1, comprising a method for generating one character template image for one character which comprises: first shooting an image of the character on the character wheel of the water meter through the camera module, and performing a image processing to obtain a binarized image of the character through the computer; then hollowing the binarized image to generate a boundary through the computer, and drawing a line with a set width in the central portion within the boundary to form the coincidence-permitted region through the computer; then adding the coincidence-restricted region outside the boundary through the computer; and removing the boundary to obtain one of the character template images through the computer.

18. The character information recognition method based on image processing according to claim 1, wherein the image preprocessing comprises image segmentation, binarization processing, mean filtering, morphological filtering and edge cutting.

19. The character information recognition method based on image processing according to claim 1, comprising a method for generating one character template image for one character which comprises: first shooting an image of the character on the character wheel of the water meter through the camera module, and performing a image processing to obtain a binarized image of the character through the computer; then hollowing the binarized image to generate a boundary through the computer, and drawing a line with a set width in the central portion within the boundary to form the coincidence-permitted region through the computer; then adding the coincidence-restricted region outside the boundary through the computer; and removing the boundary to obtain one of the character template images through the computer.

* * * * *